US007027716B1

(12) United States Patent
Boyle et al.

(10) Patent No.: US 7,027,716 B1
(45) Date of Patent: Apr. 11, 2006

(54) COMMUNICATING BETWEEN A DIGITAL VIDEO RECORDER (DVR) AND A SET TOP BOX (STB) TO COORDINATE THE DISPLAY OF A GRAPHICAL USER INTERFACE

(75) Inventors: William B. Boyle, Lake Forest, CA (US); William P. Price, Santa Ana, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1149 days.

(21) Appl. No.: 09/960,087

(22) Filed: Sep. 20, 2001

(51) Int. Cl.
*H04N 5/91* (2006.01)
*H04N 5/85* (2006.01)

(52) U.S. Cl. .................... 386/83; 386/125; 386/46
(58) Field of Classification Search ............ 386/83, 386/125, 46, 124, 45, 95, 92; H04N 5/85, H04N 5/91
See application file for complete search history.

(56) References Cited

U.S. PATENT DOCUMENTS

| 5,479,266 | A | 12/1995 | Young et al. |
|---|---|---|---|
| 5,550,576 | A | 8/1996 | Klosterman |
| 5,594,509 | A | 1/1997 | Florin et al. |
| 5,850,218 | A | 12/1998 | LaJoie et al. |
| 6,292,624 | B1 | 9/2001 | Saib et al. |
| 6,751,402 | B1 * | 6/2004 | Elliott et al. ............ 386/83 |
| 2002/0092021 | A1 * | 7/2002 | Yap et al. ............ 725/55 |
| 2002/0170073 | A1 * | 11/2002 | Miller et al. ............ 725/139 |

FOREIGN PATENT DOCUMENTS

| JP | 06233201 | 8/1994 |
|---|---|---|
| JP | 07135647 | 5/1995 |
| JP | 10162448 | 6/1998 |

OTHER PUBLICATIONS

TiVo User Guides, Personal Video Recorder, "Introduction", http://www.tivo.com.
TiVo User Guides, Personal Video Recorder, "The Basics in 5 Short Tours", http://www.tivo.com.
TiVo User Guides, Personal Video Recorder, "Connecting the PTV Recorder", http://www.tivo.com.
TiVo User Guides, DIRECTV Receiver with TiVo, "The Basics in 5 Short Tours", http://www.tivo.com.
TiVo User Guides, DIRECTV Receiver with TiVo, "Live TV", http://www.tivo.com.

* cited by examiner

*Primary Examiner*—Robert Chevalier
(74) *Attorney, Agent, or Firm*—Howard H. Sheerin, Esq.

(57) ABSTRACT

A digital video recorder (DVR) for use with a monitor and a set top box (STB) is disclosed. The STB demodulates program data from a program signal received over a communication channel and generates a STB graphical user interface (GUI). The DVR comprises a local memory for storing the program data received from the STB, a DVR interface for communicating with the STB, and a DVR controller. The DVR controller generates a DVR GUI, and in response to user input, communicates with the STB to coordinate whether the STB GUI or the DVR GUI is displayed on the monitor.

37 Claims, 12 Drawing Sheets

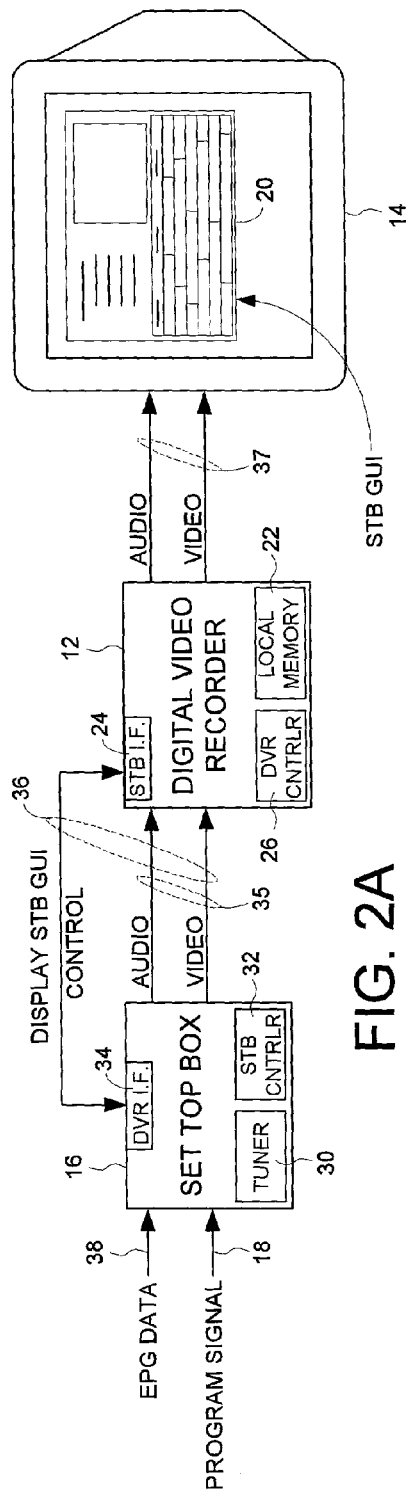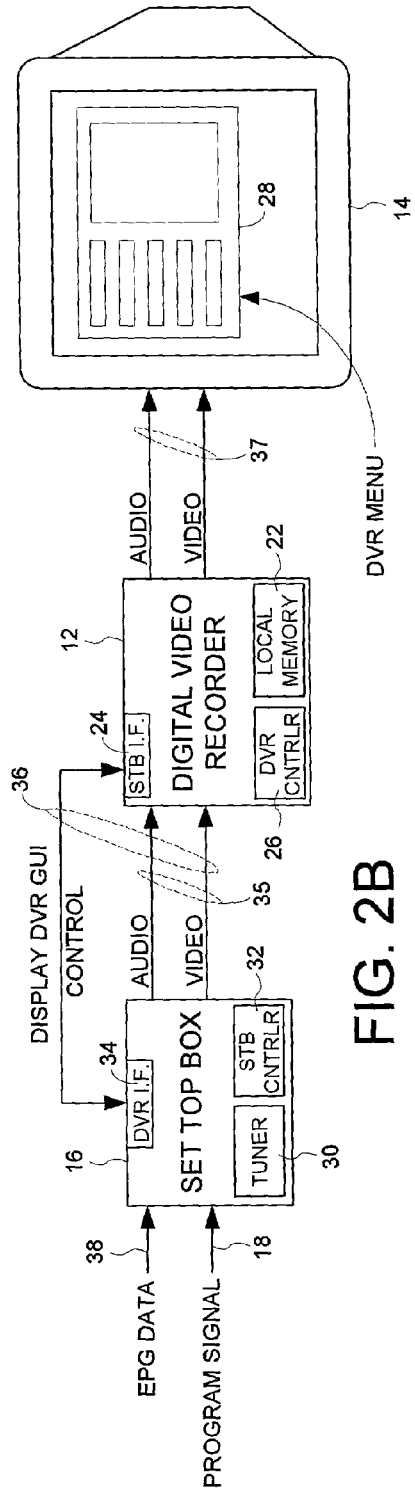

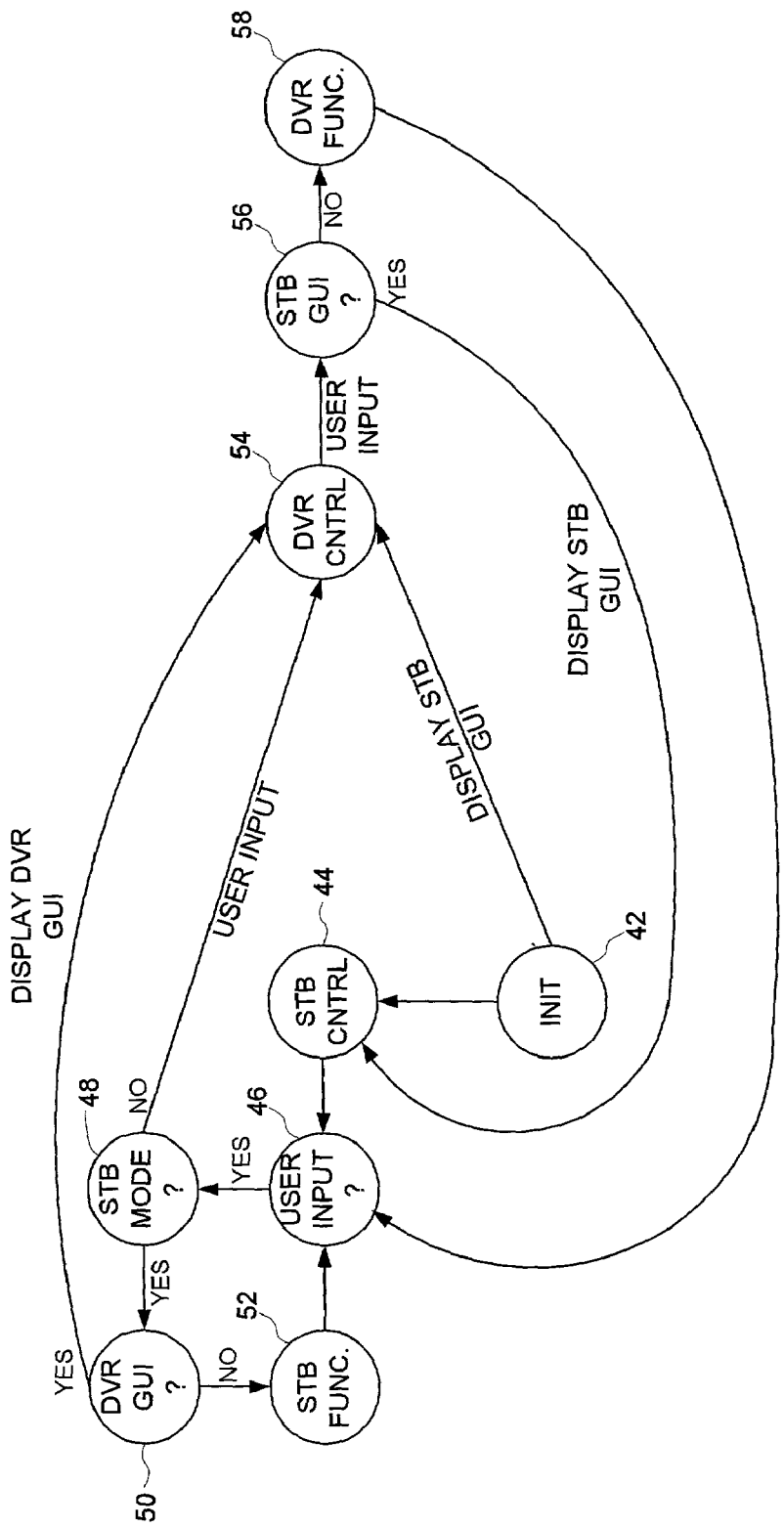

COMMUNICATING BETWEEN A DIGITAL VIDEO RECORDER (DVR) AND A SET TOP BOX (STB) TO COORDINATE THE DISPLAY OF A GRAPHICAL USER INTERFACE

CROSS REFERENCE TO RELATED APPLICATIONS AND PATENTS

This application is related to co-pending U.S. patent application Ser. No. 09/652,730 filed on Aug. 31, 2000 entitled "ELECTRONIC PROGRAM GUIDE SUBSYSTEM FOR RECEIVING AND PROCESSING ELECTRONIC PROGRAM GUIDE INFORMATION FROM A SET-TOP BOX", the disclosure of which is herein incorporated by reference.

BACKGROUND OF THE INVENTION

1. Field of the Invention

The present invention relates to digital video recorders. More particularly, the present invention relates to communicating between a digital video recorder and a set top box to coordinate the display of a graphical user interface.

2. Description of the Prior Art

FIG. 1 shows a prior art digital video recorder or DVR 2 installed between a set top box or STB 4 (e.g., a tuner for digital cable) and a monitor 6. The STB 4 demodulates a selected channel from a program signal 5 and provides an audio and video (A/V) signal 7 to the DVR 2. The DVR 2 may record the A/V signal 7 for playback at a later time, or pass the A/V signal 7 through to the monitor 6 as A/V signal 9. The DVR 2 further comprises a modem for receiving Electronic Program Guide (EPG) data over a telephone line 8. The user operates a remote control 10 to direct the DVR 2 to display the EPG data on the monitor 6 in a DVR graphical user interface (GUI). The user can peruse the EPG data in the DVR GUI to select various programs to view and/or record.

The remote control 10 is also used to control the operation of the STB 4; that is, the remote control 10 of the DVR 2 is intended to replace the remote control of the STB 4. Commands are sent from the DVR 2 to the STB 4 over a control line 12. For example, if the user selects a new channel with the remote control 10, the DVR 2 commands the STB 4 to tune to the selected channel. In another example, if a program the user previously selected for recording begins to air, the DVR 2 directs the STB 4 to tune to the appropriate channel.

Multiple System Operators (MSOs), such as AT&T digital cable, as well as other broadband providers may not want the DVR 2 to commandeer the user interface. Broadband providers may want to retain their format for displaying the EPG data in order to minimize the burden on their viewers when a DVR is added to their system. Further, broadband providers derive revenue through advertising information displayed with the EPG data, and prior art DVR systems that replace the user interface may diminish the advertising revenue derived by the broadband provider.

There is, therefore, a need for a DVR compatible with existing STB hardware that can also accommodate the existing STB GUI.

SUMMARY OF THE INVENTION

The present invention may be regarded as a digital video recorder (DVR) for use with a monitor and a set top box (STB), the STB for demodulating program data from a program signal received over a communication channel and for generating a STB graphical user interface (GUI). The STB further comprises a DVR interface. The DVR comprises a local memory for storing the program data received from the STB, a STB interface for communicating with the STB over the DVR interface, and a DVR controller. The DVR controller for generating a DVR GUI, and in response to user input, communicating with the STB to coordinate whether the STB GUI or the DVR GUI is displayed on the monitor.

In one embodiment the STB interface implements a serial communication protocol, such as the Universal Serial Bus (USB) communication protocol. In another embodiment, the STB interface implements a 1394 communication protocol. In yet another embodiment, the DVR receives the program data from the STB.

In one embodiment, at least one of the STB GUI and DVR GUI display Electronic Program Guide (EPG) data. In one embodiment, the DVR further comprises a modem for receiving Electronic Program Guide (EPG) data, the EPG data for display in the DVR GUI, and in an alternative embodiment, the DVR receives the EPG data from the STB.

In one embodiment, the STB receives a command from a remote control representing the user input. When the STB GUI is displayed on the monitor, the STB processes the command received from the remote control, and when the DVR GUI is displayed on the monitor, the STB communicates the command received from the remote control to the DVR. In an alternative embodiment, the DVR receives a command from a remote control representing the user input. When the DVR GUI is displayed on the monitor, the DVR processes the command received from the remote control, and when the STB GUI is displayed on the monitor, the DVR communicates the command received from the remote control to the STB.

In yet another embodiment, the DVR comprises a plurality of program identifiers identifying programs scheduled for recording by the DVR. The DVR communicates to the STB the plurality of program identifiers, and the STB is responsive to the plurality of program identifiers to display the STB GUI. In one embodiment, the DVR receives from the STB information identifying a program selected by a user from the STB GUI, and the DVR modifies the plurality of program identifiers using the information identifying the program selected by the user from the STB GUI. In yet another embodiment, the DVR comprises a plurality of program identifiers identifying programs recorded by the DVR. The DVR communicates to the STB the plurality of program identifiers, and the STB is responsive to the plurality of program identifiers to display the STB GUI.

In still another embodiment, the user input for displaying the STB GUI or the DVR GUI comes from a remote control comprising a first and second button for displaying the respective GUI. In an alternative embodiment, the STB GUI comprises an option for displaying the DVR GUI and the user input is generated by selecting the option to display the DVR GUI from the STB GUI.

The present invention may also be regarded as a set top box (STB) for use with a monitor and a digital video recorder (DVR). The DVR for storing program data received from the STB and for generating a DVR menu. The DVR further comprises a STB interface. The STB comprises a tuner for demodulating the program data received over a communication channel, a DVR interface for communicating with the DVR over the STB interface, and an STB controller. The STB controller for generating a STB GUI, and in response to user input, communicating with the DVR to coordinate whether the STB GUI or the DVR GUI is displayed on the monitor.

The present invention may also be regarded as a computer program embodied on a computer readable storage medium for use in a digital video recorder (DVR), the DVR for use with a monitor and a set top box (STB). The STB for demodulating program data from a program signal received over a communication channel and for generating a STB graphical user interface (GUI). The STB comprises a DVR interface and the DVR comprises a STB interface for communicating with the STB over the DVR interface. The DVR further comprises a local memory. The computer program comprises code segments for receiving the program data from the STB, and storing the program data in the local memory. The computer program further comprises code segments for generating a DVR GUI, and in response to user input, communicating with the STB to coordinate whether the STB GUI or the DVR GUI is displayed on the monitor.

The present invention may also be regarded as a computer program embodied on a computer readable storage medium for use in a set top box (STB), the STB for use with a monitor and a digital video recorder (DVR). The DVR for storing program data received from the STB and for generating a DVR GUI. The DVR comprises a STB interface and the STB comprises a DVR interface for communicating with the DVR over the STB interface. The computer program comprises a code segment for demodulating the program data from a program signal received over a communication channel. The computer program further comprises code segments for generating a STB GUI, and in response to user input, communicating with the DVR to coordinate whether the STB GUI or the DVR GUI is displayed on the monitor.

BRIEF DESCRIPTION OF THE DRAWINGS

FIGS. 2A and 2B show an embodiment of the present invention wherein a DVR communicates with the STB to coordinate whether the monitor displays the STB GUI or the DVR GUI.

FIG. 4A is a state diagram illustrating an embodiment of the present invention wherein the DVR and STB cooperate to enable user interaction with both the STB menu and the DVR menu.

DESCRIPTION OF THE PREFERRED EMBODIMENTS

Figure 1:
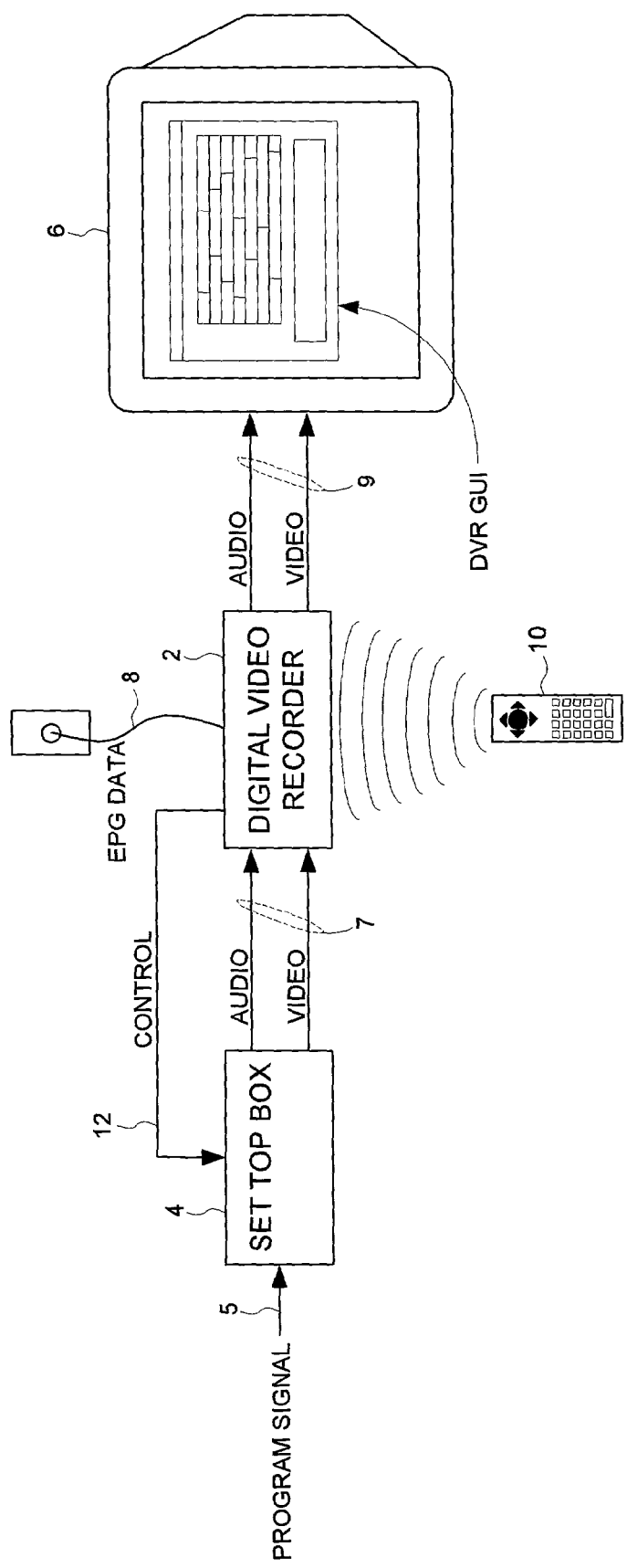
FIG. 1 shows a prior art DVR for use with a STB and a monitor, wherein the user interacts only with the DVR GUI which replaces the STB GUI.

FIGS. 2A and 2B show a digital video recorder (DVR) 12 for use with a monitor 14 and a set top box (STB) 16 according to an embodiment of the present invention. The STB 16 for demodulating program data from a program signal 18 received over a communication channel and for generating a STB graphical user interface (GUI) 20. The STB further comprises a DVR interface 34. The DVR 12 comprises a local memory 22 for storing the program data received from the STB 16, a STB interface 24 for communicating with the STB 16 over the DVR interface 34, and a DVR controller 26. The DVR controller 26 for generating a DVR GUI 28 (FIG. 2B), and in response to user input, communicating with the STB 16 to coordinate whether the monitor 14 displays the STB GUI 20 (FIG. 2A) or the DVR GUI 28 (FIG. 2B).

In the embodiment of FIGS. 2A and 2B, the STB 16 comprises a tuner 30 for demodulating the program data from the program signal 18, and a STB controller 32 for generating the STB GUI 20 and for communicating with the DVR 12 to coordinate whether the STB GUI 20 or the DVR GUI 28 is displayed on the monitor 14.

The STB 16 may be a cable set top box for receiving cable signals, a satellite set top box for receiving satellite signals, or any other similar device for receiving the program signal 18 carrying the modulated program data. The program signal 18 may be modulated at any suitable frequency, such as radio or optical frequencies, using any suitable modulation algorithm, such as quadrature amplitude modulation (QAM). The program signal 18 may be demodulated in continuous time wherein the modulated program data is transmitted in analog form, or alternatively, in discrete-time wherein the modulated program data is transmitted in digital form. Further, any suitable compression algorithm may be employed to transmit the modulated program data, such as MPEG encoding.

In one embodiment, the DVR interface 24 and STB interface 34 implement a serial communication protocol, such as the Universal Serial Bus (USB) communication protocol. However, the interfaces may implement any suitable digital communication protocol, such as the 1394 communication protocol.

In the embodiment of FIGS. 2A and 2B, the program data is communicated from the STB 16 to the DVR 12 as separate audio and video (A/V) signals 35 which may be analog or digital. In one embodiment, the A/V signal 35 is communicated via a dedicated interface using a separate communication channel, and in an alternative embodiment the A/V signal 35 is communicated via the STB interface 34 and DVR interface 24 over a common communication channel, such as a 1394 communication channel, as indicated by the dashed line 36 in FIGS. 2A and 2B.

The local memory 22 of the DVR 12 stores the program data (A/V signal 35) in digital form, and in one embodiment, in a compressed form such as MPEG. In one embodiment, the DVR 12 receives the A/V signal 35 in uncompressed form (analog or digital) and comprises suitable circuitry for performing the desired compression before storing the program data in the local memory 22 in compressed form. In an alternative embodiment, the DVR 12 receives the program data in compressed form for storing directly to the local storage 22. In the embodiment of FIGS. 2A and 2B, the DVR 12 further comprises suitable circuitry for decompressing the program data into an internal A/V signal supplied to the monitor 14 during play back.

Figure 2C:
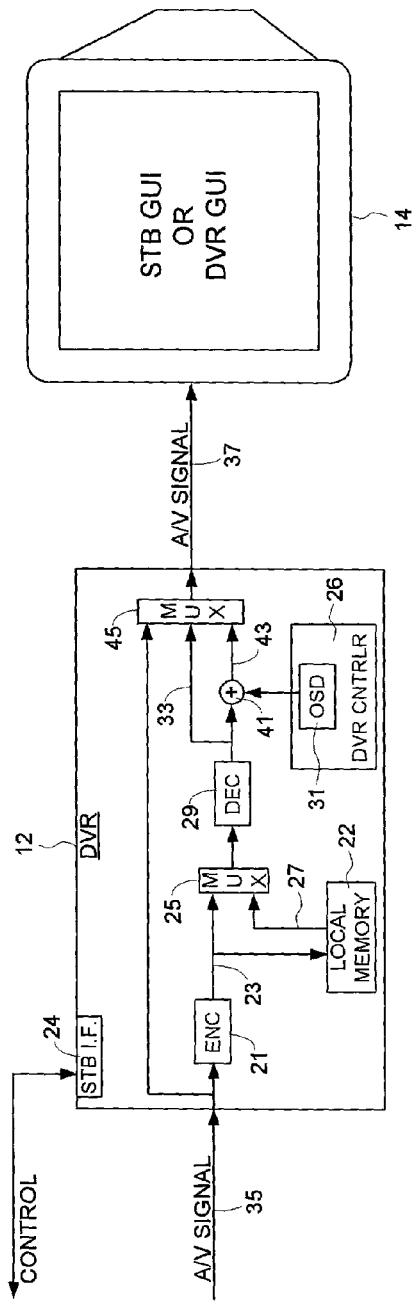
FIG. 2C shows a DVR according to an embodiment of the present invention as comprising suitable circuitry for displaying the A/V signal received from the STB (including the STB GUI), or the A/V signal generated internally (including the DVR GUI).

FIG. 2C shows details of suitable circuitry implemented by the DVR 12 according to an embodiment of the present invention. The A/V signal 35 received from the STB 16 is encoded by encoder 21 (e.g., according to the well known MPEG format). The encoded program data 23 may be stored by the local storage 22 for playback at a later time. A multiplexer 25 selects between the real-time encoded program data 23 or program data 27 stored by the local memory 22, and the selected program data is decoded by decoder 29. The DVR controller 26 comprises an on-screen display module (OSD) 31 for generating the DVR GUI 28 in a layered manner, including an A/V layer comprising the decoded A/V signal 33 output by decoder 29. An adder 41 adds the decoded A/V signal 33 with the GUI data output by the OSD 31 to generate an A/V signal 43 representing the DVR GUI 28. A multiplexer 45 selects between the A/V signal 35 received from the STB 16, the decoded A/V signal 33 output by decoder 29, and the A/V signal 43 representing the DVR GUI 28. The multiplexer 45 outputs the A/V signal 37 supplied to the monitor 14. When the user selects the A/V signal 35 from the STB for display on the monitor 14 (including the STB GUI 20), the multiplexer 45 selects the A/V signal 35 received from the STB 16. When the user selects the DVR GUI 28 for display on the monitor 14, the multiplexer 45 selects the A/V signal 43 representing the DVR GUI 28. When the user selects recorded program data for display on the monitor 14, the multiplexer selects the decoded A/V signal 33 output by the decoder 29. The DVR 12 may continue to record the A/V signal 35 received from STB 16 independent of the user's selection as to which A/V signal is displayed on the monitor 14. This enables various trick-play features, such as pausing a real-time program.

In one embodiment the STB 16 transmits a control signal to the DVR 12 requesting "focus" of the monitor 14 when the user selects the STB GUI 20 be displayed. In this manner the DVR 12 will select the A/V signal 35 from the STB 16 for display on the monitor 14 rather than the A/V signal 33 or 43 generated internally by the DVR 12.

Figure 2D:
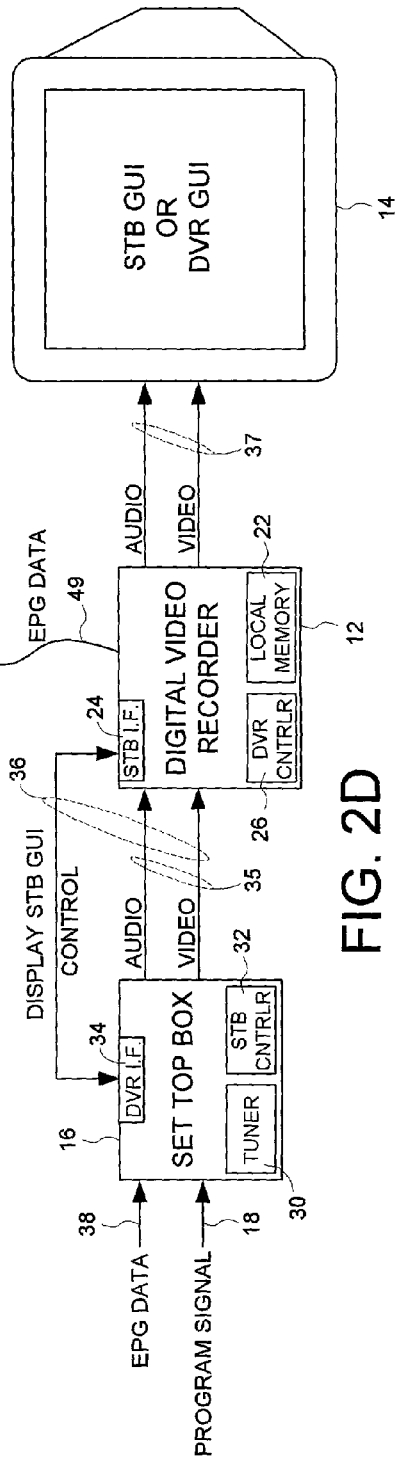
FIG. 2D shows an embodiment of the present invention wherein the DVR receives electronic program guide (EPG) data over a dedicated communication channel.

In the embodiment of FIGS. 2A and 2B, the STB 16 receives Electronic Program Guide (EPG) data 38 for use in rendering at least one of the STB GUI 20 and the DVR GUI 28. The EPG data 38 is digital data that may be sent to the STB 16 over a dedicated channel (e.g., over a telephone or cable modem, Ethernet, or other network channel) or over the same channel as the program signal 18 carrying the modulated program data. In one embodiment the EPG data 38 is communicated to the DVR 12 over the STB interface 34 and DVR interface 24. The DVR 12 uses the EPG data to render the DVR GUI as described in greater detail in the above referenced patent application entitled "ELECTRONIC PROGRAM GUIDE SUBSYSTEM FOR RECEIVING AND PROCESSING ELECTRONIC PROGRAM GUIDE INFORMATION FROM A SET-TOP BOX". In an alternative embodiment illustrated in FIG. 2D, the DVR 12 comprises suitable circuitry for receiving the EPG data over a dedicated communication channel 49 (e.g., over a telephone or cable modem, Ethernet, or other network channel).

Figure 3A:
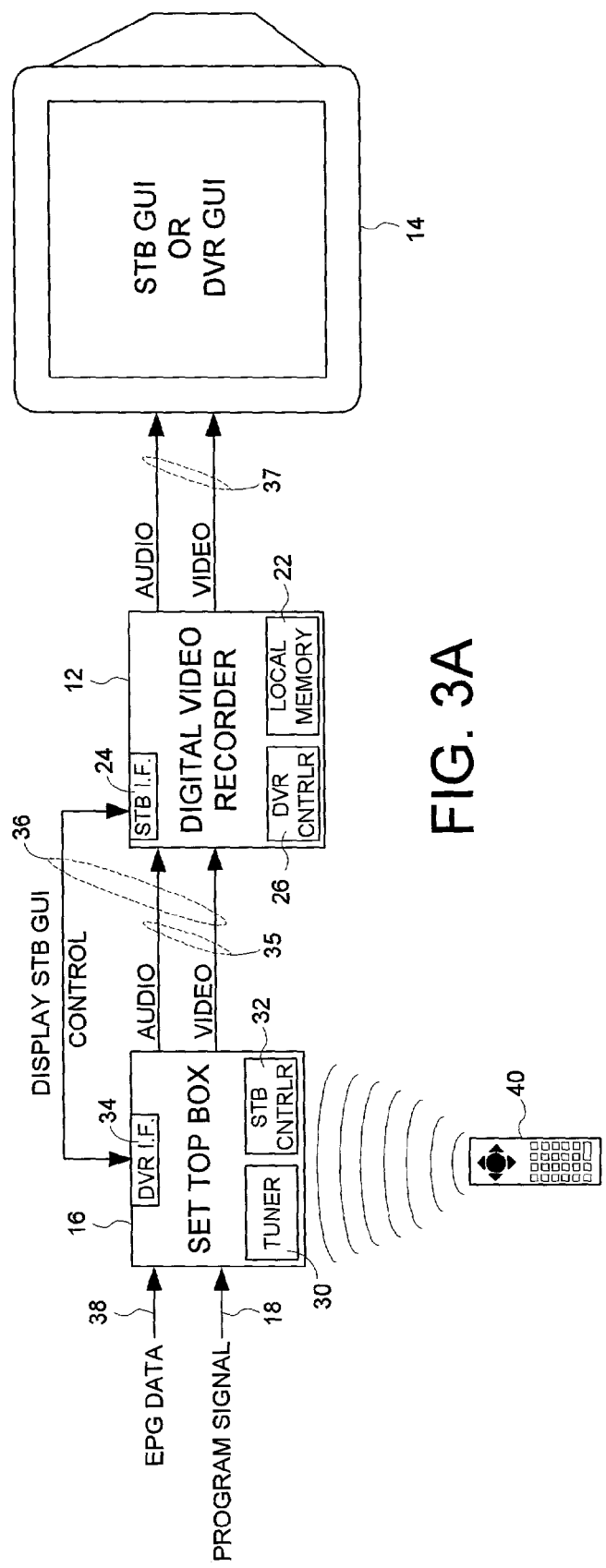
FIG. 3A shows an embodiment of the present invention wherein a STB receives commands from a remote control and forwards the commands to the DVR when the DVR GUI is displayed on the monitor.
Figure 3B:
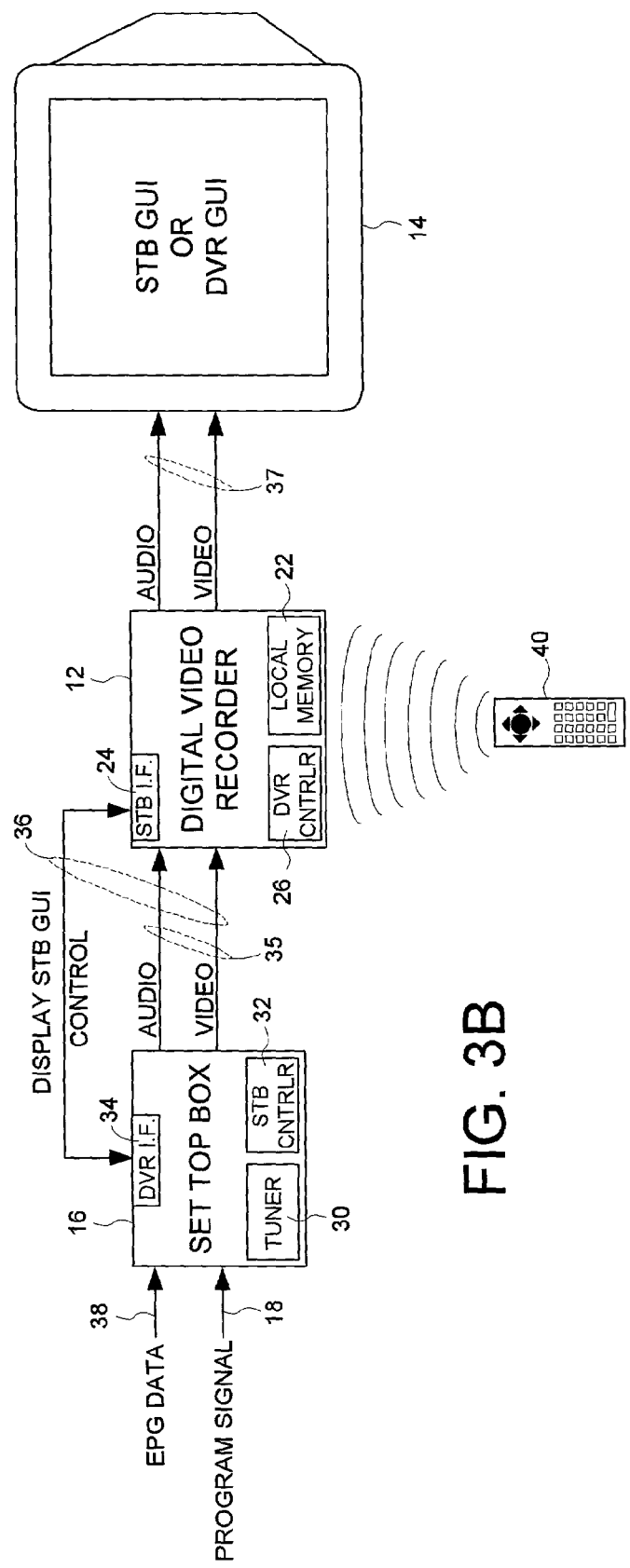
FIG. 3B shows an embodiment of the present invention wherein a DVR receives commands from a remote control and forwards the commands to the STB when the STB GUI is displayed on the monitor.

FIG. 3A shows an embodiment of the present invention wherein the STB 16 receives a command representing the user input from a remote control 40 (e.g., via an infrared interface). When the STB GUI 20 is displayed on the monitor 14, the STB 16 processes the command received from the remote control 40, and when the DVR GUI 28 is displayed on the monitor 14, the STB 16 communicates the command received from the remote control 40 to the DVR 12. In an alternative embodiment shown in FIG. 3B, the DVR 12 receives a command representing the user input from a remote control 40. When the DVR GUI 28 is displayed on the monitor 14, the DVR 12 processes the command received from the remote control 40, and when the STB GUI 20 is displayed on the monitor 14, the DVR 12 communicates the command received from the remote control 40 to the STB 16.

FIG. 4A is a state diagram illustrating an embodiment of the present invention wherein the DVR and STB cooperate to enable user interaction with both the STB GUI and the DVR GUI. When the system is initialized (powered on), the initial state 42 transmits a command to the DVR 12 to configure the DVR 12 so that the A/V signal 35 from the STB 16 is displayed on the monitor 14. The system then enters state 44 indicating that the STB 16 has focus of the monitor 14. At state 46 the system waits for user input (e.g., from the remote control 40). When user input is received, the system enters state 48 to evaluate the system mode. If the STB 16 currently has focus of the monitor 14, then at state 50 the user input is evaluated to determine whether the user has selected the option to display the DVR GUI. If not, the STB 16 processes the user input at state 52 to perform the appropriate STB function (e.g., change the tuned channel).

If at state 50 the user input indicates the user desires the DVR GUI to be displayed, then a command is sent to the DVR 12 so that the A/V signal generated internal to the DVR 12 (including the DVR GUI) is displayed on the monitor 14. That is, focus of the monitor 14 is transferred to the DVR 12 at state 54.

If at state 48 the DVR 12 has focus of the monitor 14, then the user input is communicated from the STB 16 to the DVR 12 for processing. At state 56 the user input is evaluated to determine whether the user has selected the option to display the STB GUI. If not, the DVR 12 processes the user input at state 58 to perform the appropriate DVR function. The system then returns to state 46 to wait for more user input.

If at state 56 the user input indicates the user has selected the option to display the STB GUI, then the DVR 12 is configured to display the A/V signal 35 from the STB 16 and a command is communicated to the STB 16 to display the STB GUI. The system then enters state 44 indicating that the STB 16 has focus of the monitor 14.

Figure 4B:
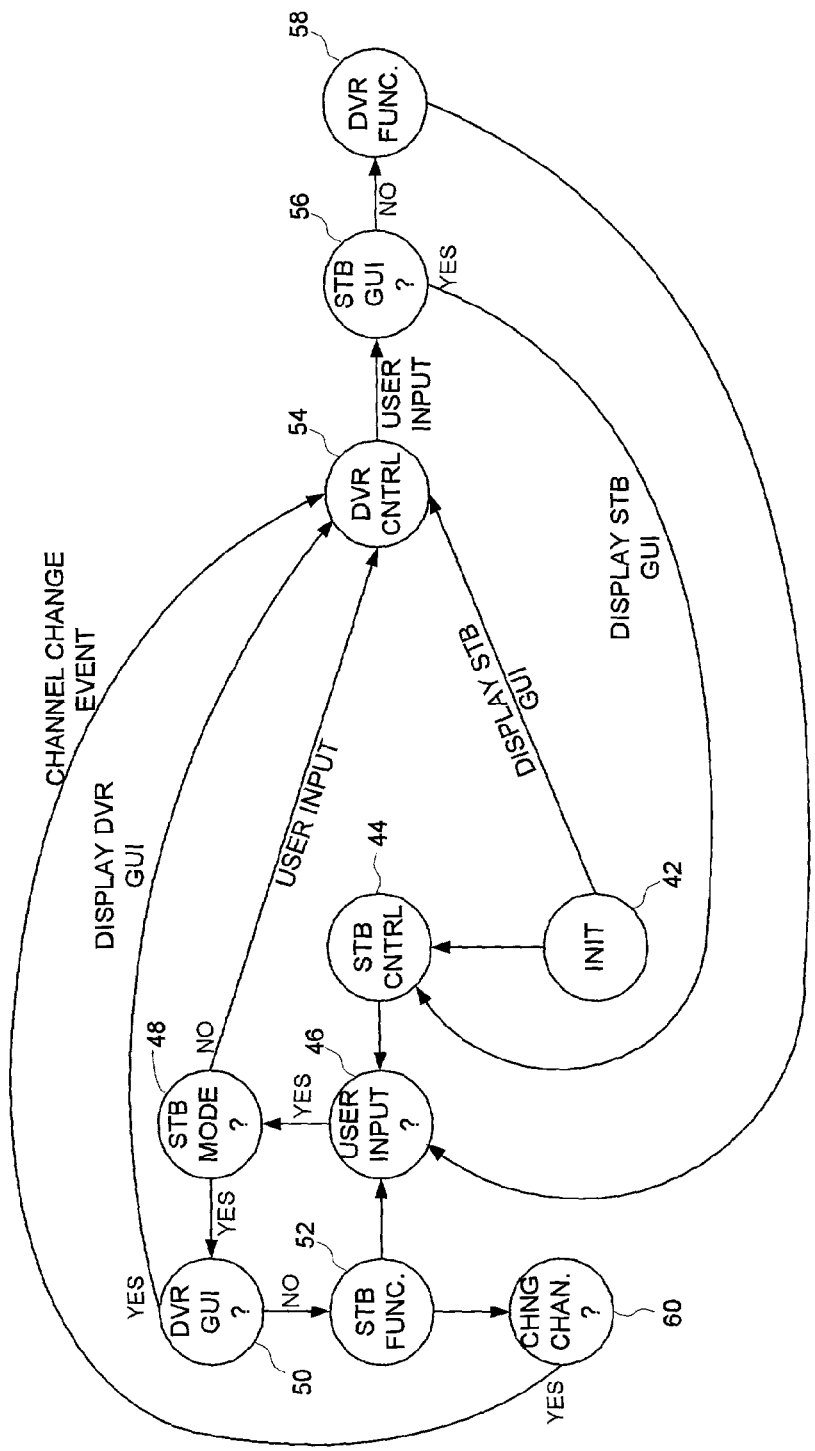
FIG. 4B is a state diagram illustrating an embodiment of the present invention wherein the STB transmits a channel-change event to the DVR whenever the user controls the STB directly to change the tuned channel.

FIG. 4B is a state diagram illustrating an embodiment of the present invention wherein the STB 16 transmits a channel-change event to the DVR 12 whenever the user controls the STB 16 directly to change the tuned channel.

The state diagram of FIG. 4B is essentially the same as the state diagram of FIG. 4A with an additional state 60 which transmits the channel-change event from the STB 16 to the DVR 12 in connection with the STB 16 changing the tuned channel. In one embodiment, the channel-change event is transmitted to the DVR 12 before the STB 16 actually changes the tuned channel. In this manner, the DVR 12 can warn the user that changing the tuned channel will affect the operation of the DVR 12, allowing the user to abort the operation if desired. In this embodiment, the DVR 12 transmits a control signal to the STB 16 authorizing the STB 16 to change the tuned channel (or abort the operation).

In one embodiment, the DVR 12 comprises a plurality of program identifiers. The DVR 12 communicates to the STB 16 the plurality of program identifiers independent of when the STB 16 demodulates the program data identified by the plurality of program identifiers. The STB 16 is responsive to the plurality of program identifiers to modify at least one selected operation of the STB 16. In one embodiment, the plurality of program identifiers identify respective programs scheduled for recording by the DVR 12. In another embodiment, the plurality of program identifiers identify respective programs already recorded by the DVR 12. In one embodiment, the STB 16 uses the plurality of program identifiers to display the STB GUI, and in one embodiment, to display the EPG data. In another embodiment, the STB 16 uses the plurality of program identifiers to demodulate the program data identified by the program identifiers.

Figure 5:
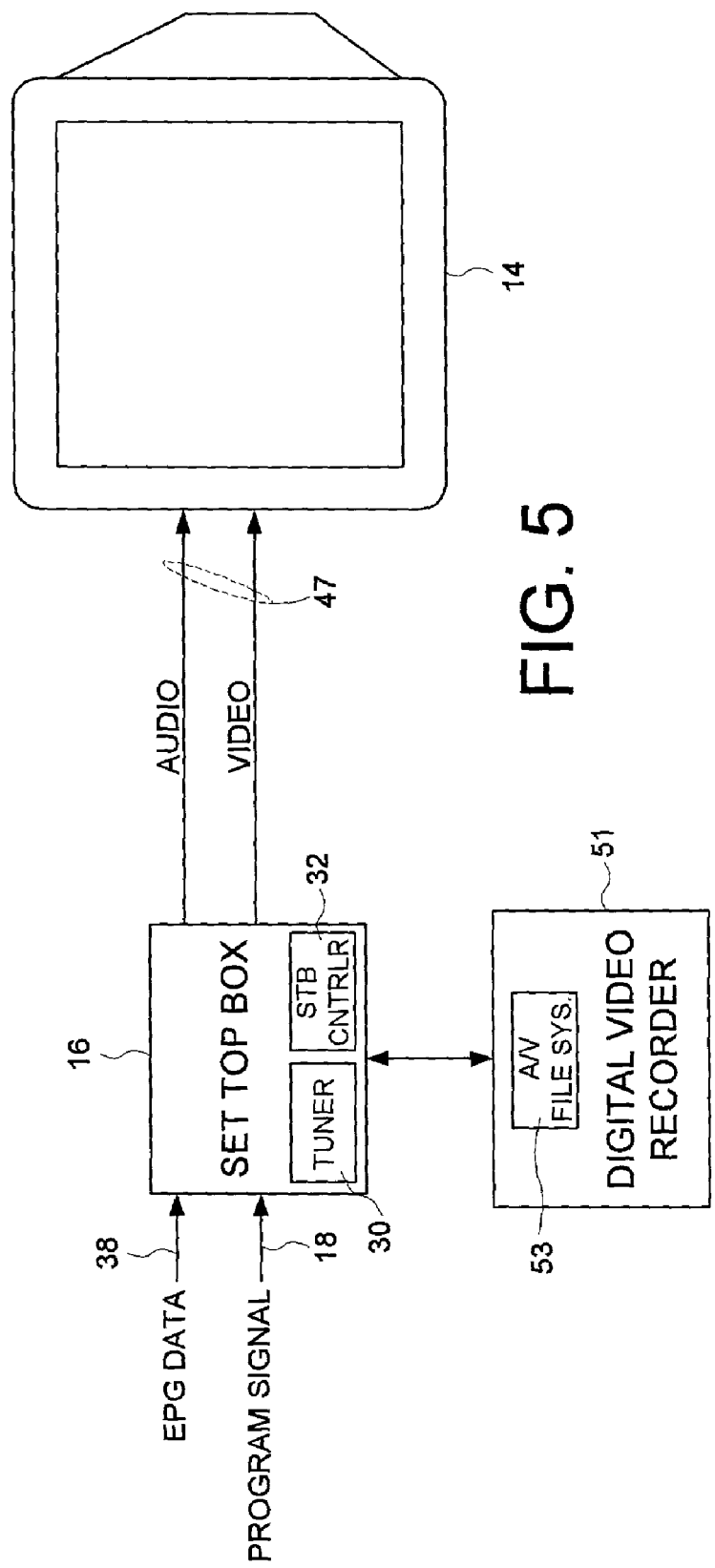
FIG. 5 shows an embodiment of the present invention wherein a DVR comprises an A/V file system for storing A/V data.

FIG. 5 shows an embodiment wherein a DVR 51 comprises an A/V file system 53 for storing the A/V data. The STB 16 retrieves the plurality of program identifiers from the DVR 51 by accessing the A/V file system 53.

In another embodiment, the DVR 12 receives from the STB 16 information identifying a program selected by the user from the STB GUI. The DVR 12 modifies the plurality of program indicators in response to the program selected by the user from the STB GUI.

Figure 6:
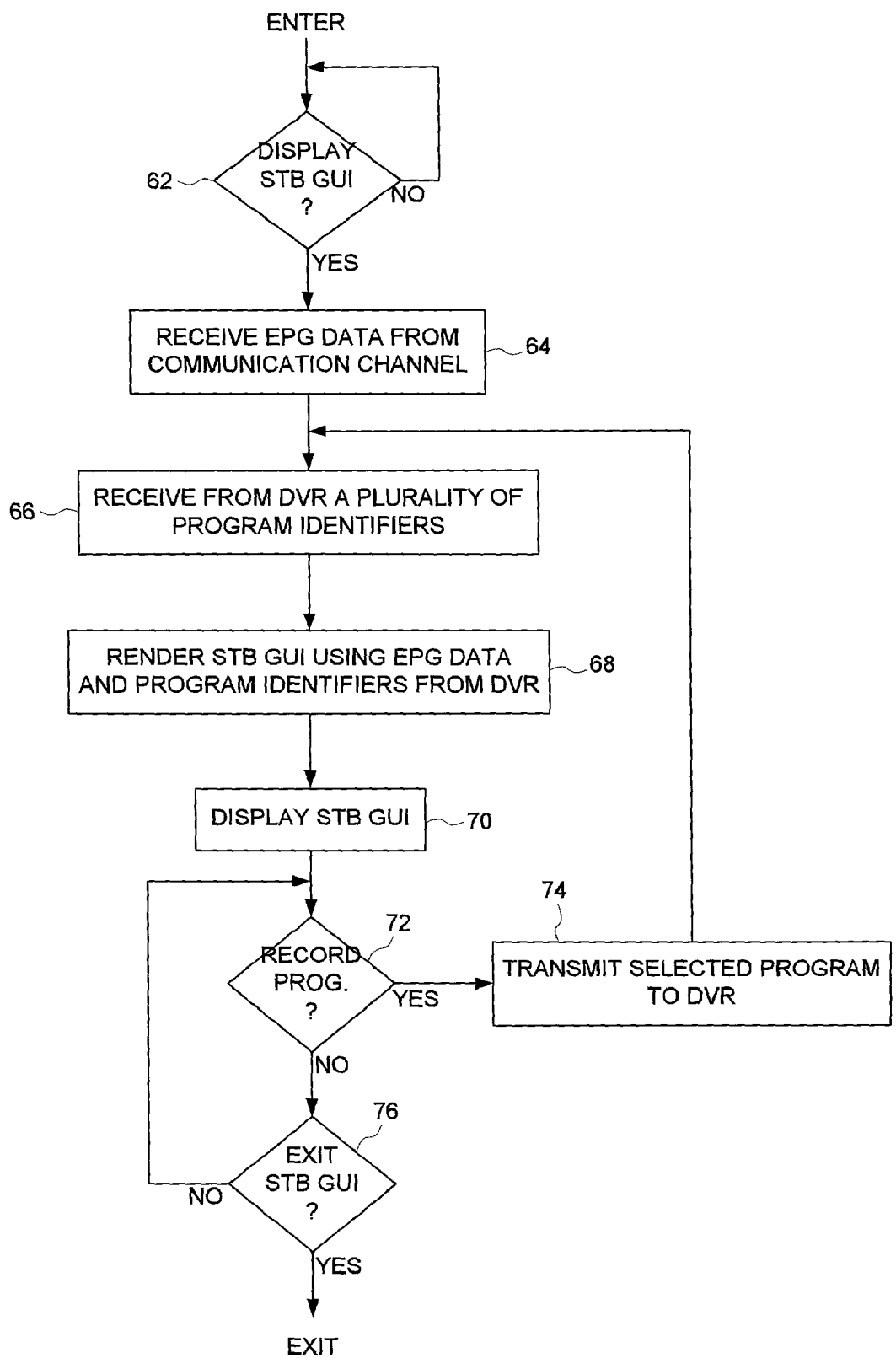
FIG. 6 is a flow diagram according to an embodiment of the present invention wherein the STB receives a list of programs recorded as well as programs scheduled for recording from the DVR and uses the program lists to display EPG data in the STB GUI.

FIG. 6 is a flow diagram illustrating the aforementioned embodiments. At step 62 the system waits until the user selects the option to display the STB GUI. At step 64 the STB 16 receives EPG data from a communication channel (e.g., over the same channel as the modulated program data or over a dedicated communication channel). At step 66 the STB 16 receives from the DVR 12 the plurality of program identifiers. At step 68 the STB 16 renders the STB GUI using the EPG data and the plurality of program identifiers received from the DVR 12, and at step 70 the STB GUI is displayed on the monitor 14. If at step 72 the user selects a program to record from the STB GUI, then at step 74 the EPG data identifying the selected program is transmitted to the DVR 12 and the DVR 12 updates the plurality of program identifiers so that the selected program will be recorded. Control then loops back to step 66 so that the STB GUI is updated to reflect the user's selection to record the program. The procedure exits when at step 76 the user elects to exit the STB GUI.

Figure 7A:
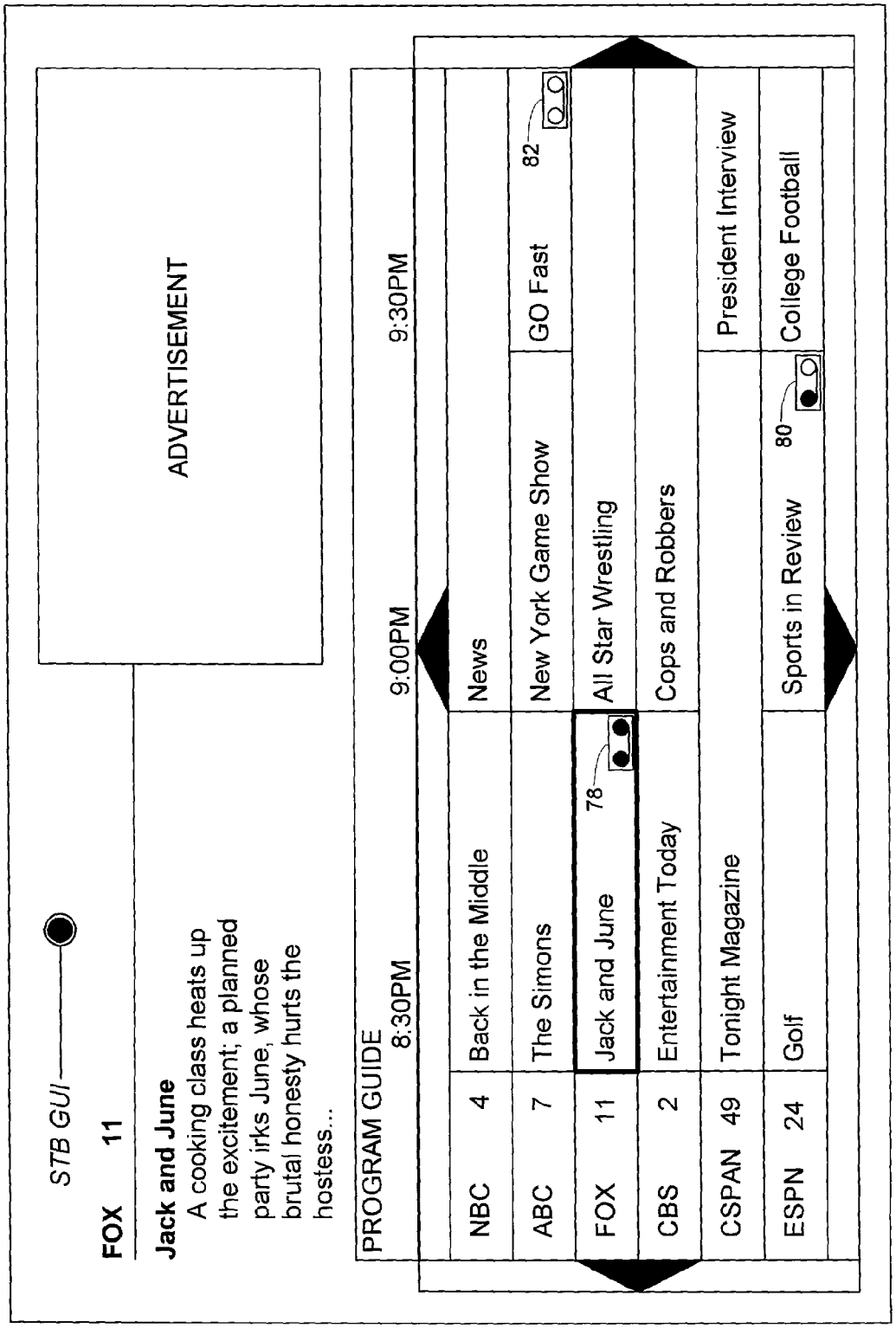
FIG. 7A shows an example STB GUI according to an embodiment of the present invention comprising a program guide having indicators of the programs recorded by the DVR as well as programs scheduled for recording by the DVR.

FIG. 7A shows a program guide displayed as part of a STB GUI according to an embodiment of the present invention. The program guide comprises a plurality of program identifiers for identifying programs broadcast on respective channels relative to the time of day (information derived from the EPG data). In addition, the program guide comprises recording indicators for identifying programs that have been recorded and programs scheduled for recording by the DVR 12. In one embodiment, the recording indicators are derived from the program identifiers received from the DVR 12. Displaying the program guide together with the recording indicators is not limited to the STB GUI; the program guide may be rendered by any suitable video component capable of processing EPG data, such as the DVR 12 or the monitor 14.

In the example of FIG. 7A, the time of day is 9:15 pm. The program "Jack and June" has been recorded as indicated by the icon 78 comprising two filled circles. The program "Sports in Review" is currently being recorded as indicated by the icon 80 comprising a filled circle and an empty circle. The program "GO Fast" is scheduled for recording starting at 9:30 pm as indicated by the icon 82 comprising two empty circles. This modification enhances the program guide by providing the user with program recording information together with the program guide information. Otherwise the user must exit the program guide and display another menu (e.g., a DVR menu) to view the program recording information which is inconvenient.

Figure 7B:
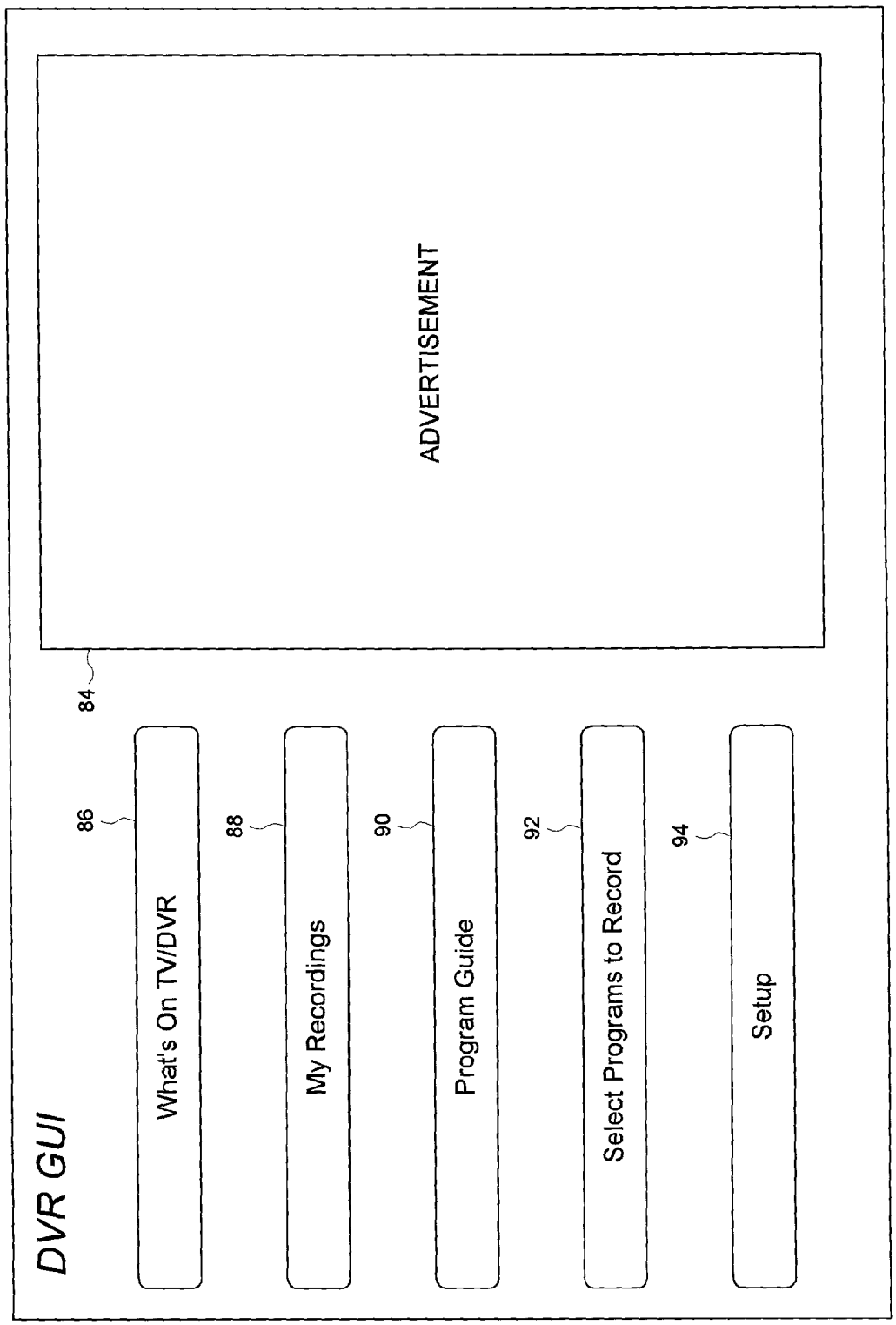
FIG. 7B shows an example DVR GUI according to an embodiment of the present invention comprising options for manipulating the DVR and an option for displaying the STB GUI.

FIG. 7B shows an example DVR GUI according to an embodiment of the present invention. The DVR GUI comprises an advertisement 84 and five user selectable options. The "What's on TV" option 86 displays a menu of programs currently being broadcast together with the prerecorded programs in a user preferred format. The "My Recordings" option 88 displays a menu of recorded shows together with EPG data such as the actors, director, and brief synopsis of each program. The "Program Guide" option 90 returns the user to the STB GUI (e.g., the STB GUI of FIG. 7A). The "Select Programs to Record" option 92 displays a menu that enables the user to search for programs to record. For example, the user may search for all "comedy" programs wherein the DVR GUI will display a list of all comedies broadcast over the available channels (as determined from the EPG data). The "Setup" option 94 displays a menu allowing the user to configure the DVR 12 (e.g., display movies in wide-screen or standard format).

Figure 8:
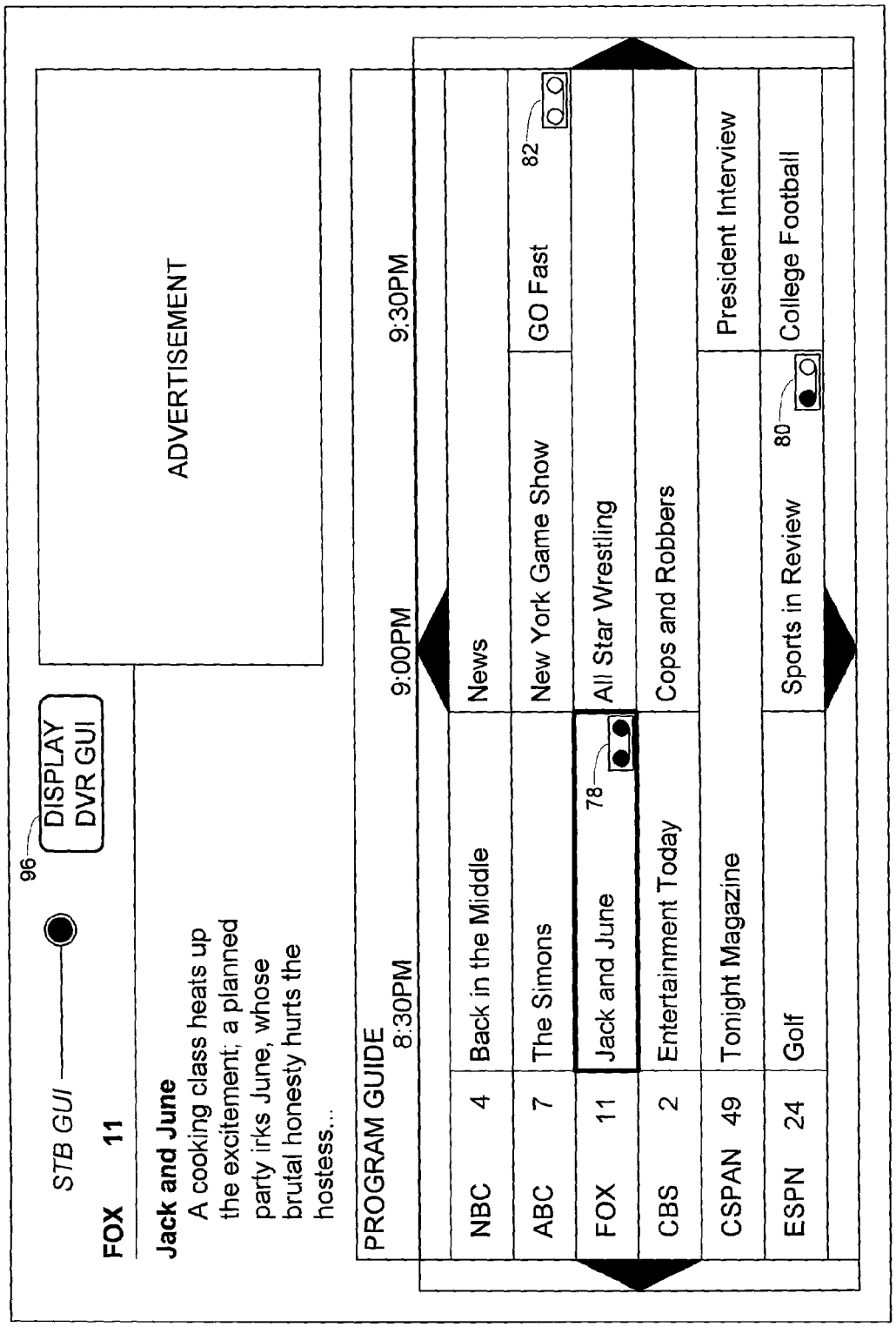
FIG. 8 shows an example STB GUI according to an embodiment of the present invention comprising an option for displaying the DVR GUI.

FIG. 8 shows a STB GUI according to an alternative embodiment of the present invention. In this embodiment, the STB GUI comprises an option 96 for displaying the DVR GUI (e.g., the DVR GUI of FIG. 7B). In one embodiment, selecting the option 96 from the STB GUI is the only way to access the DVR GUI. In this manner, the user must go through the STB GUI to reach the DVR GUI ensuring that the content of the STB GUI (including advertising content) is always displayed to the user.

In another embodiment, the remote control 40 (FIG. 3A or 3B) for generating the user input comprises a first button for selecting the STB GUI to be displayed on the monitor 14 and a second button for selecting the DVR GUI to be displayed on the monitor 14. This embodiment allows the user to quickly switch between the two GUIs by selecting the appropriate buttons on the remote control 40. Referring again to FIG. 3A, when the user presses the button to display the STB GUI, the STB 16 communicates a command to the DVR 12 requesting focus of the monitor 14 so that the DVR will display the A/V signal 35 generated by the STB 16, including the embedded STB GUI. When the user presses the button to display the DVR GUI, the STB 16 communicates a command to the DVR 12 directing it to take focus of the monitor 14 by displaying its internal A/V signal (e.g., A/V signal 43 of FIG. 2C), including the embedded DVR GUI.

In one embodiment, the DVR 12 executes a computer program embodied on a computer readable storage medium (e.g., local memory 22). The computer program comprises code segments for receiving the program data from the STB 16, and storing the program data in the local memory 22. The computer program further comprises code segments for generating the DVR GUI 28, and in response to user input, communicating with the STB 16 to coordinate whether the STB GUI 20 or the DVR GUI 28 is displayed on the monitor 14.

In another embodiment, the STB 16 executes a computer program embodied on a computer readable storage medium (e.g., a non-volatile semiconductor memory connected to the STB controller 32). The computer program comprises a code segment for demodulating the program data from the program signal 18 received over a communication channel. The computer program further comprises code segments for generating the STB GUI 20, and in response to user input, communicating with the DVR 12 to coordinate whether the STB GUI 20 or the DVR GUI 28 is displayed on the monitor.

We claim:

1. A digital video recorder (DVR) for use with a monitor and a set top box (STB), the STB for demodulating program data from a program signal received over a communication channel and for generating a STB graphical user interface (GUI), the STB comprising a DVR interface, the DVR comprising:
    (a) a local memory for storing the program data received from the STB;
    (b) a STB interface for communicating with the STB over the DVR interface; and
    (c) a DVR controller for:
       generating a DVR GUI; and
       in response to user input, communicating with the STB to coordinate whether the STB GUI or the DVR GUI is displayed on the monitor.

2. The DVR as recited in claim 1, wherein the STB interface implements a serial communication protocol.

3. The DVR as recited in claim 2, wherein the STB interface implements a Universal Serial Bus (USB) communication protocol.

4. The DVR as recited in claim 1, wherein the STB interface implements a 1394 communication protocol.

5. The DVR as recited in claim 1, wherein the DVR receives the program data from the STB.

6. The DVR as recited in claim 1, wherein at least one of the STB GUI and DVR GUI display Electronic Program Guide (EPG) data.

7. The DVR as recited in claim 1, further comprising a modem for receiving Electronic Program Guide (EPG) data, the EPG data for display in the DVR GUI.

8. The DVR as recited in claim 1, wherein the DVR receives Electronic Program Guide (EPG) data from the STB, the EPG data for display in the DVR GUI.

9. The DVR as recited in claim 1, wherein when the user input indicates that the STB GUI should be displayed on the monitor, the STB communicates a request to the DVR to display the STB GUI.

10. The DVR as recited in claim 1, wherein when the user input indicates that the DVR GUI should be displayed on the monitor, the STB communicates a request to the DVR to display the DVR GUI.

11. The DVR as recited in claim 1, wherein when the user input indicates that the STB GUI should be displayed on the monitor, the DVR communicates a request to the STB to display the STB GUI.

12. The DVR as recited in claim 1, wherein:
    (a) the STB receives a command representing the user input from a remote control;
    (b) when the STB GUI is displayed on the monitor, the STB processes the command received from the remote control; and
    (c) when the DVR GUI is displayed on the monitor, the STB communicates the command received from the remote control to the DVR.

13. The DVR as recited in claim 1, wherein:
    (a) the DVR receives a command representing the user input from a remote control;
    (b) when the DVR GUI is displayed on the monitor, the DVR processes the command received from the remote control; and
    (c) when the STB GUI is displayed on the monitor, the DVR communicates the command received from the remote control to the STB.

14. The DVR as recited in claim 1, wherein:
    (a) the DVR comprises a plurality of program identifiers identifying programs scheduled for recording by the DVR;
    (b) the DVR communicates to the STB the plurality of program identifiers; and
    (c) the STB is responsive to the plurality of program identifiers to display the STB GUI.

15. The DVR as recited in claim 1, wherein:
    (a) the DVR comprises a plurality of program identifiers identifying programs scheduled for recording by the DVR;
    (b) the DVR receives from the STB information identifying a program selected by a user from the STB GUI; and
    (c) the DVR modifies the plurality of program identifiers using the information identifying the program selected by the user from the STB GUI.

16. The DVR as recited in claim 1, wherein:
    (a) the DVR comprises a plurality of program identifiers identifying programs recorded by the DVR;
    (b) the DVR communicates to the STB the plurality of program identifiers; and
    (c) the STB is responsive to the plurality of program identifiers to display the STB GUI.

17. The DVR as recited in claim 1, wherein:
    (a) the user input is generated using a remote control; and
    (b) the remote control comprises a first button for selecting the STB GUI to be displayed on the monitor and a second button for selecting the DVR GUI to be displayed on the monitor.

18. The DVR as recited in claim 1, wherein:
    (a) the STB GUI comprises an option for displaying the DVR GUI; and
    (b) the user input is generated by selecting the option to display the DVR GUI from the STB GUI.

19. A set top box (STB) for use with a monitor and a digital video recorder (DVR), the DVR for storing program data received from the STB and for generating a DVR GUI, the DVR comprising a STB interface, the STB comprising:
    (a) a tuner for demodulating the program data from a program signal received over a communication channel;
    (b) a DVR interface for communicating with the DVR over the STB interface; and
    (c) a STB controller for:
       generating a STB GUI; and
       in response to user input, communicating with the DVR to coordinate whether the STB GUI or the DVR GUI is displayed on the monitor.

20. The STB as recited in claim 19, wherein the DVR interface implements a serial communication protocol.

21. The STB as recited in claim 20, wherein the DVR interface implements a Universal Serial Bus (USB) communication protocol.

22. The STB as recited in claim 19, wherein the DVR interface implements a 1394 communication protocol.

23. The STB as recited in claim 19, wherein the STB transmits the program data to the DVR.

24. The STB as recited in claim 19, wherein at least one of the STB GUI and DVR GUI display Electronic Program Guide (EPG) data.

25. The STB as recited in claim 19, wherein the STB communicates Electronic Program Guide (EPG) data to the DVR, the EPG data for display in the DVR GUI.

26. The STB as recited in claim 19, wherein when the user input indicates that the STB GUI should be displayed on the monitor, the STB communicates a request to the DVR to display the STB GUT.

27. The STB as recited in claim 19, wherein when the user input indicates that the DVR GUI should be displayed on the monitor, the STB communicates a request to the DVR to display the DVR GUI.

28. The STB as recited in claim 19, wherein when the user input indicates that the STB GUI should be displayed on the monitor, the DVR communicates a request to the STB to display the STB GUI.

29. The STB as recited in claim 19, wherein:
(a) the STB receives a command representing the user input from a remote control;
(b) when the STB GUI is displayed on the monitor, the STB processes the command received from the remote control; and
(c) when the DVR GUI is displayed on the monitor, the STB communicates the command received from the remote control to the DVR.

30. The STB as recited in claim 19, wherein:
(a) the DVR receives a command representing the user input from a remote control;
(b) when the DVR GUI is displayed on the monitor, the DVR processes the command received from the remote control; and
(c) when the STB GUI is displayed on the monitor, the DVR communicates the command received from the remote control to the STB.

31. The STB as recited in claim 19, wherein:
(a) the DVR comprises a plurality of program identifiers identifying programs scheduled for recording by the DVR;
(b) the DVR communicates to the STB the plurality of program identifiers; and
(c) the STB is responsive to the plurality of program identifiers to display the STB GUI.

32. The STB as recited in claim 19, wherein:
(a) the DVR comprises a plurality of program identifiers identifying programs scheduled for recording by the DVR;
(b) the DVR receives from the STB information identifying a program selected by a user from the STB GUI; and (c) the DVR modifies the plurality of program identifiers using the information identifying the program selected by the user from the STB GUI.

33. The STB as recited in claim 19, wherein:
(a) the DVR comprises a plurality of program identifiers identifying programs recorded by the DVR;
(b) the DVR communicates to the STB the plurality of program identifiers; and
(c) the STB is responsive to the plurality of program identifiers to display the STB GUI.

34. The STB as recited in claim 19, wherein:
(a) the user input is generated using a remote control; and
(b) the remote control comprises a first button for selecting the STB GUI to be displayed on the monitor and a second button for selecting the DVR GUI to be displayed on the monitor.

35. The STB as recited in claim 19, wherein:
(a) the STB GUI comprises an option for displaying the DVR GUI; and
(b) the user input is generated by selecting the option to display the DVR GUI from the STB GUI.

36. A computer program embodied on a computer readable storage medium for use in a digital video recorder (DVR), the DVR for use with a monitor and a set top box (STB), the STB for demodulating program data from a program signal received over a communication channel and for generating a STB graphical user interface (GUI), the STB comprising a DVR interface and the DVR comprising a STB interface for communicating with the STB over the DVR interface, the DVR comprising a local memory, the computer program comprising code segments for:
(a) receiving the program data from the STB;
(b) storing the program data in the local memory;
(c) generating a DVR GUI; and
(d) in response to user input, communicating with the STB to coordinate whether the STB GUI or the DVR GUI is displayed on the monitor.

37. A computer program embodied on a computer readable storage medium for use in a set top box (STB), the STB for use with a monitor and a digital video recorder (DVR), the DVR for storing program data received from the STB and for generating a DVR GUI, the DVR comprising a STB interface and the STB comprising a DVR interface for communicating with the DVR over the STB interface, the computer program comprising code segments for:
(a) demodulating the program data from a program signal received over a communication channel;
(b) generating a STB GUI; and
(c) in response to user input, communicating with the DVR to coordinate whether the STB GUI or the DVR GUI is displayed on the monitor.

* * * * *